United States Patent
Hoashi et al.

(10) Patent No.: US 7,152,063 B2
(45) Date of Patent: Dec. 19, 2006

(54) SCHEME FOR FILTERING DOCUMENTS ON NETWORK USING RELEVANT AND NON-RELEVANT PROFILES

(75) Inventors: Keiichirou Hoashi, Tokyo (JP); Naomi Inoue, Tokyo (JP); Kazunori Matsumoto, Ohmiya (JP); Kazuo Hashimoto, Fujimi (JP)

(73) Assignee: DDI Corporation, Tokyo (JP)

( * ) Notice: Subject to any disclaimer, the term of this patent is extended or adjusted under 35 U.S.C. 154(b) by 303 days.

(21) Appl. No.: 09/795,841

(22) Filed: Feb. 28, 2001

(65) Prior Publication Data
US 2001/0032204 A1    Oct. 18, 2001

(30) Foreign Application Priority Data
Mar. 13, 2000   (JP)   ............................ P2000-069477

(51) Int. Cl.
*G06F 17/40* (2006.01)
(52) U.S. Cl. .............................. 707/5; 715/513; 707/1; 707/2; 707/3; 707/4; 707/6; 707/7; 707/8; 707/9; 707/10
(58) Field of Classification Search .............. 707/1–10, 707/5–7
See application file for complete search history.

(56) References Cited

U.S. PATENT DOCUMENTS

| | | | | |
|---|---|---|---|---|
| 5,717,913 A | * | 2/1998 | Driscoll | 707/5 |
| 6,430,559 B1 | * | 8/2002 | Zhai | 707/5 |
| 6,473,754 B1 | * | 10/2002 | Matsubayashi et al. | 707/5 |
| 6,480,835 B1 | * | 11/2002 | Light | 707/3 |
| 6,542,889 B1 | * | 4/2003 | Aggarwal et al. | 707/5 |
| 6,546,390 B1 | * | 4/2003 | Pollack et al. | 707/7 |

* cited by examiner

*Primary Examiner*—Mohammad Ali
*Assistant Examiner*—Sathyanarayan Pannala
(74) *Attorney, Agent, or Firm*—Olson & Hierl, Ltd.

(57) ABSTRACT

A document filtering scheme capable of reducing the number of erroneously selected non-relevant documents without reducing the number of correctly selected relevant documents is disclosed. a non-relevant profile expressing non-relevant documents that are judged as having high similarities with respect to a relevant profile expressing a user's request but not matching with the user's request is utilized in addition to the relevant profile, such that each search target document for which the similarity with respect to the relevant profile is higher than a prescribed threshold for the relevant profile and the similarity with respect to the non-relevant profile is higher than a prescribed threshold for the non-relevant profile is removed as a non-relevant document.

12 Claims, 7 Drawing Sheets

SCHEME FOR FILTERING DOCUMENTS ON NETWORK USING RELEVANT AND NON-RELEVANT PROFILES

BACKGROUND OF THE INVENTION

1. Field of the Invention

The present invention relates to a scheme for filtering documents which extract and output documents that match a relevant profile indicating a user's request from search target documents on a network.

2. Description of the Background Art

The document filtering technique of this kind is effective in extracting only information that matches with preferences of a user from a stream of a large amount of text information such as that of news information delivery service using e-mails, for example, and providing it to the user. Namely, the document filtering is a task for acquiring only documents that satisfy the user's request from sequentially arriving search target documents and providing them to the user.

In such a document filtering, the user's request is expressed inside a filtering system as a profile. Then, the filtering system judges whether this profile is satisfied or not with respect to each one of the sequentially arriving search target documents, and presents only those documents satisfying the user's request to the user. The user judges whether each presented document actually satisfies the request or not, and provides a feedback on that judgement to the filtering system. In many cases, the filtering system makes an improvement on the filtering accuracy by updating the profile according to the feedback from the user.

Most of the filtering systems employ techniques used in the information retrieval. In many cases, documents and profiles to be entered into the system are expressed inside the system according to vector space model or the like and a similarity between the profile and the document is used as a criterion for judging whether each document satisfies the profile or not. Also, the retrieval formula expansion method of the information retrieval is often applied to the profile updating of the document filtering. Namely, the profile is updated by adding information extracted from the selected documents to the profile according to the relevance feedback information from the user, so as to refine the profile.

Now, the processing procedure of the conventional document filtering method utilizing such a profile updating will be described with reference to FIG. 1.

In this document filtering method, the similarity between a profile q and each search target document d is calculated in order to search out documents similar to the profile q representing the user's request from the search target documents (step S71). Then, whether the calculated similarity between the profile q and the search target document d is higher than a prescribed threshold or not is judged (step S73). When the similarity is not higher than the prescribed threshold, the processing returns to the step S71 and the same processing is repeated for the next search target document, whereas when the similarity is higher than the prescribed threshold, a relevance feedback is obtained (step S7) and the profile q is updated (step S77). This processing is carried out for all the search target documents, and then the processing is terminated (step S79).

In such a document filtering method, the document filtering is carried out by a general procedure of selecting those documents for which the similarity with respect to the profile exceeds the threshold and then presenting them to the user. However, in this filtering method, setting of an appropriate threshold is difficult as will be described below, such that when the threshold is set low in order to select many relevant documents, the number of erroneously selected non-relevant documents will increase considerably, whereas when the threshold is set high in order to reduce the erroneously selected non-relevant documents, many relevant documents will be overlooked.

As already mentioned above, the retrieval formula expansion technique used in the information retrieval is often applied to the profile updating in such a document filtering method. Next, the profile updating method utilizing the retrieval formula expansion method based on word contributions in the information retrieval which can obtain a high accuracy will be described.

First, the retrieval formula expansion method based on word contributions will be described. The word contribution is a scale in which the influence of each word in the similarity between documents is expressed numerically. The word contribution of a word $w_i$ in the similarity between an input sentence q and a retrieval target document d is defined by the following equation (1).

$$\text{Cont}(w_i, q, d) = \text{Sim}(1, d) - \text{Sim}(q'(w_i), d'(w_i)) \quad (1)$$

where Sim(q, d) is a similarity between q and d, q' ($w_i$) is a sentence in which the word $w_i$ is excluded from the input sentence q, and d' ($w_i$) is a document in which the word $w_i$ is excluded from d.

Namely, the word contribution Cont ($w_i$, q, d) is a difference between the similarity of q and d and the similarity of q' and d' in which the word $w_i$ is absent. Consequently, among all the words that appear in q and d, the contribution of a word which raises the similarity is positive, and the contribution of a word which lowers the similarity is negative.

It is also known that many words appearing in documents have nearly zero contributions, and a rather small number of words have significant influences on the similarity. Among them, words that have large positive contributions are words which exist in both the input sentence and the retrieval target document. On the other hand, it is considered that words that have large negative contributions are words which exist only in either one document and which are expressing characteristics of that document prominently. For this reason, in the retrieval formula expansion method based on word contributions, the expansion of the retrieval formula is carried out as follows.

First, when a group of documents that are matching with the input sentence q:

$$D_{rel}(q) = \{d1, \ldots, d_{Num}\} \quad (2)$$

is given, the contributions of all words appearing in each document belonging to $D_{rel}(q)$ are obtained, and N words with low word contributions are extracted from each similar document. Next, a total sum of the contributions by each extracted word w is multiplied by a weight "wgt", and this is taken as a score with respect to the word w. When the contribution of the word w with respect to the input sentence q and the document d is denoted as Cont(w, q, d), the score Score(w) of the word w can be expressed by the following equation (3).

$$\text{Score}(w) = wgt \times \sum_{d \in D_{rel}(q)} \text{Cont}(w, q, d) \quad (3)$$

Then, the retrieval formula expansion is realized by adding those words that are not contained in the original retrieval formula among the extracted words, to the retrieval formula.

At a time of adding some word w into a vector of the input sentence, the score Score(w) calculated by the equation (3) is regarded as a frequency for which the word w appears in the input sentence (word appearance frequency tf), and the value of an element expressing the word w in the vector of the input sentence is calculated. When each element of the vector is calculated by TF*IDF, the retrieval formula expansion is realized by calculating TF by setting Score(w) as tf and multiplying IDF of the word w, and entering the resulting TF*IDF value into an element for the word w in the vector of the input sentence.

Next, the profile updating method based on word contributions will be described.

In the retrieval formula expansion based on word contributions, the score of each word is obtained by multiplying a weight to a total sum of contributions of words that are extracted according to their contributions from each document in the relevant document set that is obtained according to the feedback with respect to the initial retrieval result. Here, words are extracted according to their contributions from each document selected during the filtering, and a profile is updated sequentially by adding information on the extracted words to an immediately previous profile.

First, when the selected document is a relevant document, the score $Score_{rel}(w_i)$ of the extracted word $w_i$ is calculated by the following equation (4), or when the selected document is a non-relevant document, the score $Score_{nrel}(W_i)$ of the extracted word $w_i$ is calculated by the following equation (5).

$$Score_{rel}(w_i) = wgt_{relR} \times Cont(w_i, q, d) \qquad (4)$$

$$Score_{nrel}(w_i) = wgt_{nrelR} \times Cont(w_i, q, d) \qquad (5)$$

Then, the weight for each word is calculated by the TF*IDF method by treating the score of each word as obtained by the above equation as a word appearance frequency tf. Then, a word and its weight are added to the original profile when the extracted word is a word in the relevant document, or a word and its weight are subtracted from the original profile when the extracted word is a word in the non-relevant document. Namely, an element for each word selected from the relevant document is added to the original profile and an element for each word selected from the non-relevant document is subtracted from the original profile. Note that the words with negative weights will not be used in the similarity calculation as a result of this processing.

By the above processing, positive values are given to originally valueless dimensions of the vector representing the profile, so that the profile information is expanded. Also, the weights for words originating from both the relevant documents and the non-relevant documents are suppressed, while the weighs of words that appear only in the relevant documents are emphasized.

Here, both the search target document and the profile are expressed by using the vector space model, and the filtering with respect to each document is realized by calculating the similarity between them.

In expressing each document and profile by using the vector space model, the weight for each element of the vector representing each document or profile is calculated by the TF*IDF method. Here, the calculation formulas for TF and IDF to be used are those based on an algorithm used in the SMART which is one of the most effective information retrieval systems, which are given by the following expressions (6) and (7).

$$\text{TF factor: } \log(1+tf_{ij}) \qquad (6)$$

$$\text{IDF factor: } \log\left(\frac{M}{df_j}\right) \qquad (7)$$

where $tf_{ij}$ is an appearance frequency of a word $w_j$ in a document $d_i$, $df_j$ is the number of documents in which a word $w_j$ appears, and M is the number of documents contained in the document set used at a time of vocabulary compilation.

Also, the similarity is obtained in terms of normalized values by taking a cosine of the vectors for the profile and the search target document as defined by the following equation (8).

$$\cos(\vec{q}, \vec{d}) = \frac{\vec{q} \cdot \vec{d}}{|\vec{q}||\vec{d}|} \qquad (8)$$

where $\vec{q}$ and $\vec{d}$ are the vectors representing the profile and the search target document respectively, and $|\vec{d}|$ is the Euclidean length of $\vec{d}$.

In this profile updating method, TF and IDF are calculated by using the expressions (6) and (7) by treating the score of each word as obtained by the equation (4) or (5) as a word appearance frequency tf. Consequently, the TF*IDF value of each word is calculated by the following equations (9) and (10).

$$Value_{rel}(w_i) = \log(1 + Score_{rel}(w_i)) \times \log\left[\frac{M}{df_i}\right] \qquad (9)$$

$$Value_{nrel}(w_i) = \log(1 + Score_{nrel}(w_i)) \times \log\left[\frac{M}{df_i}\right] \qquad (10)$$

where $df_i$ is the number of documents in which a word $w_i$ appears, and M is the number of documents used in producing a list of df.

Also, the profile q and the document d are expressed according to the vector space model, by the following equations (11) and (12) respectively.

$$\vec{q} = (q_1, \ldots, q_n) \qquad (11)$$

$$\vec{d} = (d_1, \ldots, d_n) \qquad (12)$$

where $q_1, \ldots, q_n$ are weights for words in the profile, $d_1, \ldots, d_n$ are weights for words in each document, and n is the number of dimensions of the vector.

The profile after updating can be expressed by the following equation (13), where each element for each extracted word $w_i$ is given by the following equation (14) in the case of a word in the relevant document, or by the following equation (15) in the case of a word in the non-relevant document.

$$\vec{q}_{new} = (q_1', \ldots, q_n') \quad (13)$$

$$q_i' = q_i + \text{Value}_{rel}(w_i) \quad (14)$$

$$q_i' = q_i - \text{Value}_{nrel}(w_i) \quad (15)$$

In other words, an element of each word selected from the relevant document is added to the elements of the original profile and an element of each word selected from the non-relevant document is subtracted from the elements of the original profile. Note that the words with negative weights will not be used in the similarity calculation as a result of this processing.

FIG. 2 shows the procedure of this profile updating method which proceeds as follows. As shown in FIG. 2, with respect to the profile q, the updated profile $q_{new}$, and the selected document d which are expressed according to the vector space model, a word set W is extracted from the selected document d first (step S83), and whether the selected document d is a relevant document or not is judged (step S85). When the selected document d is a relevant document, the score of each word is calculated by the equation (4) (step S87), and the score of each word $w_i$ is added to the profile q as in the equation (14) (step S89). When the selected document d is not a relevant document, the score of each word is calculated by the equation (5) (step S88), and the score of each word $w_i$ is subtracted from the profile q as in the equation (15) (step S91). Then, the profile after such addition or subtraction is set as the updated profile $q_{new}$ (step S93).

The evaluation test using data prepared by the Filtering Track of TREC-8 was conducted according to the above described profile updating method. FIG. 3 shows the similarities with respect to the profile of the relevant documents and the non-relevant documents that were selected when the threshold of the similarity was set equal to 0.1.

As can be seen from FIG. 3, there are only few non-relevant documents with the similarities that are considerably higher than the threshold, but the relevant documents and the non-relevant documents are coexisting for the similarities in vicinity of the threshold.

Thus, in the conventional document filtering method, there are only few non-relevant documents with the similarities that are considerably higher than the threshold, but the relevant documents and the non-relevant documents are coexisting for the similarities in vicinity of the threshold, so that it is impossible to select only the relevant documents with these similarities.

For example, when the threshold is set low in order to select many relevant documents, the number of erroneously selected non-relevant documents will increase, whereas when the threshold is set high, the number of erroneously selected non-relevant documents can be reduced but the number of correctly selected relevant documents will also be reduced.

In other words, when an attempt to obtain many relevant documents is made by applying the retrieval formula expansion method in the information retrieval to the profile updating and simply setting the threshold of the similarity, there has been a problem that many non-relevant documents will also be selected.

SUMMARY OF THE INVENTION

It is therefore an object of the present invention to provide a document filtering scheme capable of reducing the number of erroneously selected non-relevant documents without reducing the number of correctly selected relevant documents.

In the present invention, this is realized by producing a non-relevant profile expressing features of erroneously selected non-relevant documents, and not selecting documents with high similarities with the non-relevant profile.

According to one aspect of the present invention there is provided a document filtering method for extracting documents matching with a relevant profile expressing a user's request from search target documents and presenting extracted documents to a user. Initially there is produced a non-relevant profile expressing non-relevant documents that are judged as having high similarities with respect to the relevant profile but not matching with the user's request. Then a first similarity between the relevant profile and each search target document is calculated, and the first similarity is compared with a prescribed first threshold for the relevant profile. A second similarity between the non-relevant profile and each search target document is calculated for which the second similarity is higher than the prescribed second threshold as a non-relevant document, and each search target document is selected for which the second similarity is not higher than the prescribed second threshold as a relevant document then the relevant profile and the non-relevant profile are updated according to a feedback from the user regarding relevance of documents presented to the user.

According to another aspect of the present invention extracting documents matching with a relevant profile expressing a user's request from search target documents and presenting extracted documents to a user, a non-relevant profile production unit is constructed and arranged to produce a non-relevant profile but not matching with the user's request. A relevant profile similarity calculation unit is constructed and arranged to calculate a first similarity between the relevant profile and each search target document, and compare the first similarity with a prescribed first threshold for the relevant profile A non-relevant profile similarity calculation unit is configured to calculate a second similarity between the non-relevant profile and each search target document for which the first similarity is higher than the prescribed first threshold, and compare the second similarity with a prescribed second threshold for the non-relevant profile a relevance judgment unit is configured to remove each search target document for which the second similarity is higher than the prescribed second threshold as a non-relevant document, and select each search target document for which the second similarity is not higher than the prescribed second threshold as a relevant document A profile updating unit is configured to update the relevant profile and the non-relevant profile according to a feedback from the user regarding relevance of documents presented to the user.

According to another aspect of the present invention there is provided a computer usable medium having computer readable program codes embodied therein for causing a computer to function as a document filtering system for extracting documents matching with a relevant profile expressing a user's request from search target documents and presenting extracted documents to a user The computer readable program codes include a first computer readable program code for causing said computer to produce a non-relevant profile expressing non-relevant documents that are judged as having high similarities with respect to the relevant profile but not matching with the user's request Also provided are a second computer readable program code for causing said computer to calculate a first similarity between the relevant profile and each search target document, and compare the first similarity with a prescribed first threshold for the relevant profile and a third computer readable program code for causing said computer to calculate a second similarity between the non-relevant profile and each search target document for which the first similarity is higher than the prescribed first threshold, and compare the second similarity with a prescribed second threshold for the non-relevant profile In addition there are provided a fourth computer readable program code for causing said computer to remove each search target document for which the second similarity is higher than the prescribed second threshold as a non-relevant document, and select each search target document for which the second similarity is not higher than the prescribed second threshold as a relevant document, and a fifth computer readable program code for causing said computer to update the relevant profile and the non-relevant profile according to a feedback from the user regarding relevance of documents presented to the user.

Other features and advantages of the present invention will become apparent from the following description taken in conjunction with the accompanying drawings.

DETAILED DESCRIPTION OF THE PREFERRED EMBODIMENTS

Referring now to FIG. 4 to FIG. 7, one embodiment of the document filtering scheme according to the present invention will be described in detail.

Figure 1:
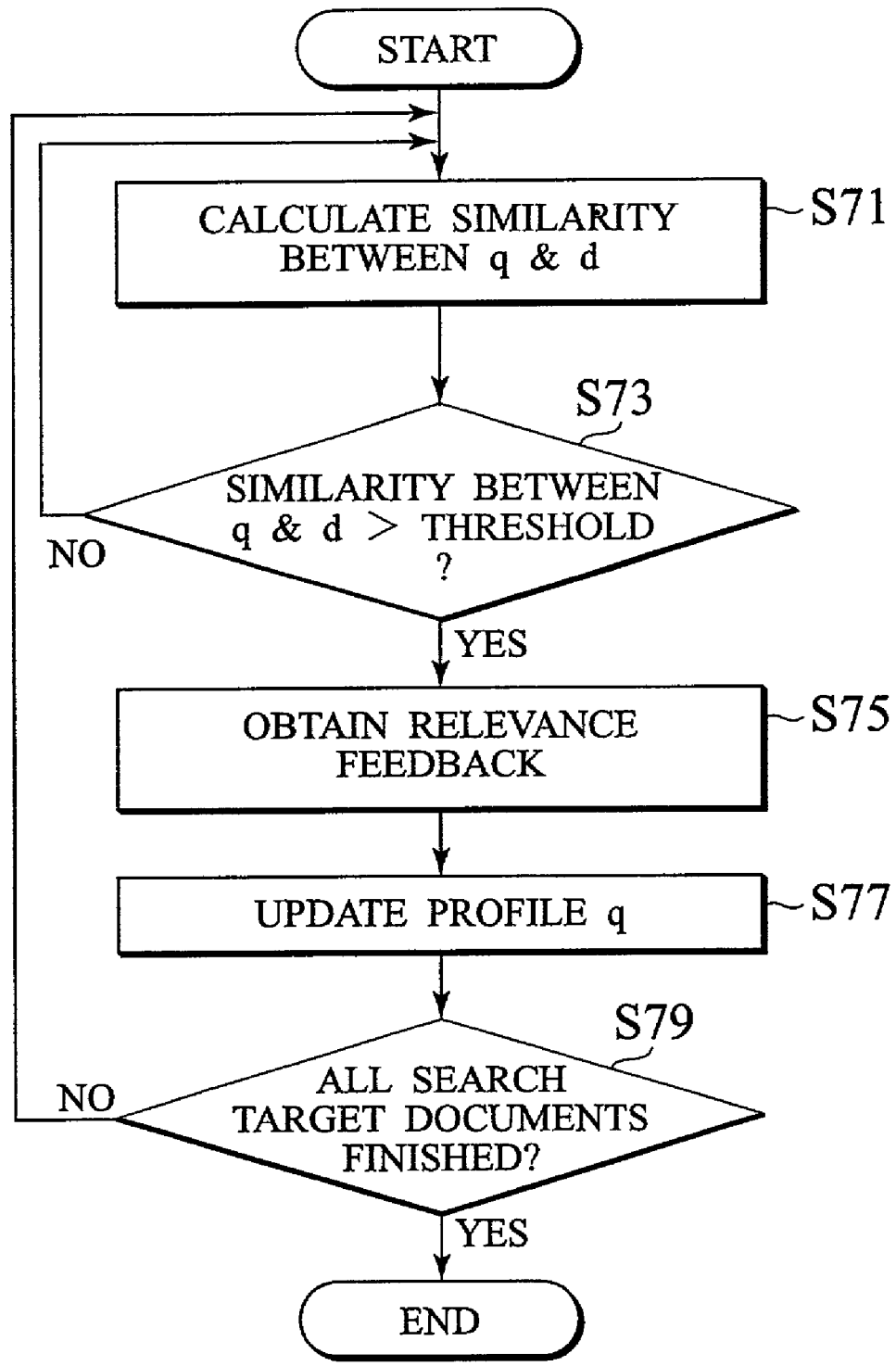
FIG. 1 is a flow chart for the conventional document filtering processing utilizing the profile updating.
Figure 2:
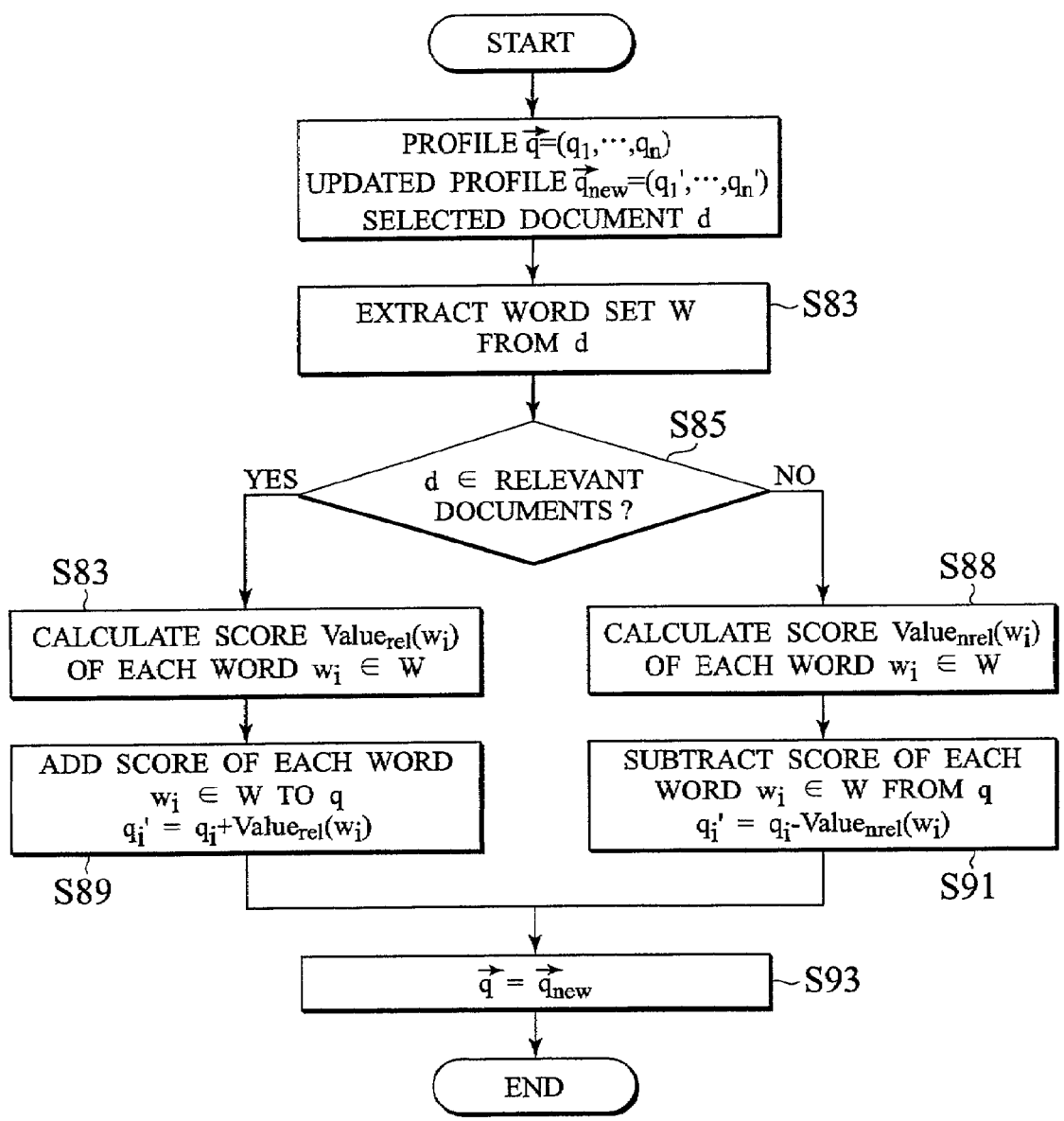
FIG. 2 is a flow chart for a profile updating processing to be carried out in the conventional document filtering processing of FIG. 1.
Figure 3:
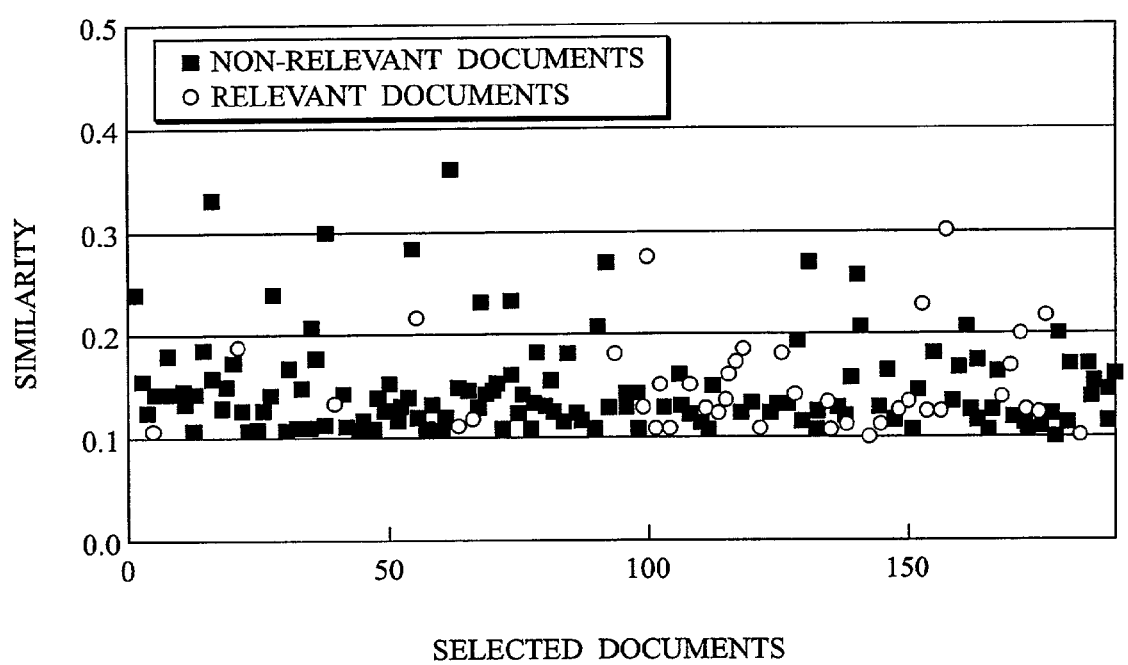
FIG. 3 is a graph showing similarities of relevant documents and non-relevant documents obtained by an evaluation test of the conventional document filtering processing of FIG. 1.
Figure 4:
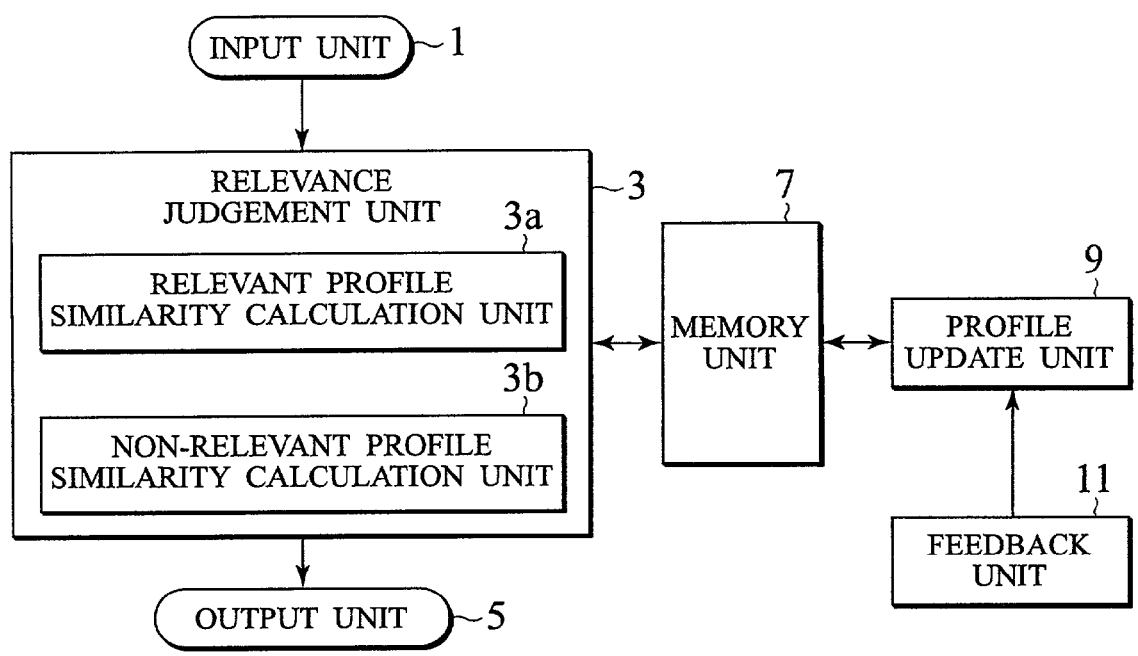
FIG. 4 is a block diagram showing a configuration of a document filtering system for executing a document filtering method according to one embodiment of the present invention.

FIG. 4 shows a configuration of a document filtering system for executing the document filtering method according to one embodiment of the present invention.

This document filtering system comprises an input unit 1 for inputting a profile representing a user's request and search target documents, a relevance judgement unit 3 having a relevant profile similarity calculation unit 3a for calculating similarities with respect to a relevant profile and a non-relevant profile similarity calculation unit 3b for calculating similarities with respect to a non-relevant profile, an output unit 5 for outputting documents matching with the user's request to a user, a memory unit 7 for storing information on profiles, a profile updating unit 9 for updating profiles, and a feedback unit 11 for providing a relevance feedback.

Now, before describing the operation of the document filtering system in the above described configuration, an outline of the document filtering method according to the present invention will be described.

As described above, the conventionally used profile (which will be denoted as $q_R$ hereafter) has been updated by accounting for the features of the relevant documents so as to express the user's request. However it is known that an attempt to select only those documents which are similar to $q_R$ will result in also selecting many non-relevant documents as well.

Consequently, it is possible to expect the improvement of the accuracy by not selecting non-relevant documents which have high similarities with respect to the profile but which are actually not matching with the user's request.

To this end, a profile characterizing the non-relevant documents that were selected in the past as documents that were judged as having high similarities with $q_R$ is produced as a non-relevant profile (which will be denoted as $q_N$ hereafter). Documents that have high similarities with respect to $q_N$ are similar to those non-relevant documents that were erroneously selected in the past, so that by not selecting such documents, it is possible to avoid selecting the non-relevant documents that were erroneously selected by the conventional method.

The document filtering method of the present invention that is based on this idea will now be described in further detail.

First, words are extracted from the selected document according to their contributions, similarly as in the conventional profile updating. Then, when the extracted word is a word in a relevant document, the score $Score_{relN}(W_i)$ of the word is calculated by the following equation (16), or when the extracted word is a word in a non-relevant document, the score $Score_{nrelN}(W_i)$ of the word is calculated by the following equation (17).

$$Score_{relN}(W_i) = wgt_{relN} \times Cont(w_i, q, d) \qquad (16)$$

$$Score_{nrelN}(W_i) = wgt_{nrelN} \times Cont(w_i, q, d) \qquad (17)$$

Then, the TF*IDF value of each word $w_i$ is calculated by using the following equations (18) and (19) by treating the score of each word as obtained by the equation (16) or (17) as a word appearance frequency tf.

$$Value_{relN}(w_i) = \log(1 + Score_{relN}(w_i)) \times \log\left[\frac{M}{df_i}\right] \qquad (18)$$

$$Value_{nrelN}(w_i) = \log(1 + Score_{nrelN}(w_i)) \times \log\left[\frac{M}{df_i}\right] \qquad (19)$$

where $df_i$ is the number of documents in which a word $w_i$ appears, and M is the number of documents used in producing a list of df.

Also, $q_N$ and the updated profile $q_{Nnew}$ are expressed by the following equations (20) and (21).

$$\vec{q}_N(q_{N1}, \ldots, q_{Nn}) \qquad (20)$$

$$\vec{q}_{Nnew} = (q_{N1}', \ldots, q_{Nn}') \qquad (21)$$

Then, contrary to the updating of $q_R$, $q_N$ is updated by subtracting $Value_{relN}(W_i)$ from the vector expressing $q_N$ in the case where the extracted word $w_i$ is a word in a relevant document as in the following equation (22), or by adding $\text{Value}_{nrelN}(W_i)$ in the case where the extracted word $w_i$ is a word in a non-relevant document as in the following equation (23), so as to express features of the non-relevant documents.

$$q_{Ni}' = q_{Ni} - \text{Value}_{relN}(W_i) \quad (22)$$

$$q_{Ni}' = q_{Ni} + \text{Value}_{nrelN}(w_i) \quad (23)$$

Then, for each document for which the similarity with respect to $q_R$ exceeds the threshold, the similarity with respect to $q_N$ is calculated, and any document for which the similarity with respect to $q_N$ exceeds the threshold for $q_N$ is judged as similar to the non-relevant documents erroneously selected in the past, and not selected.

Figure 5:
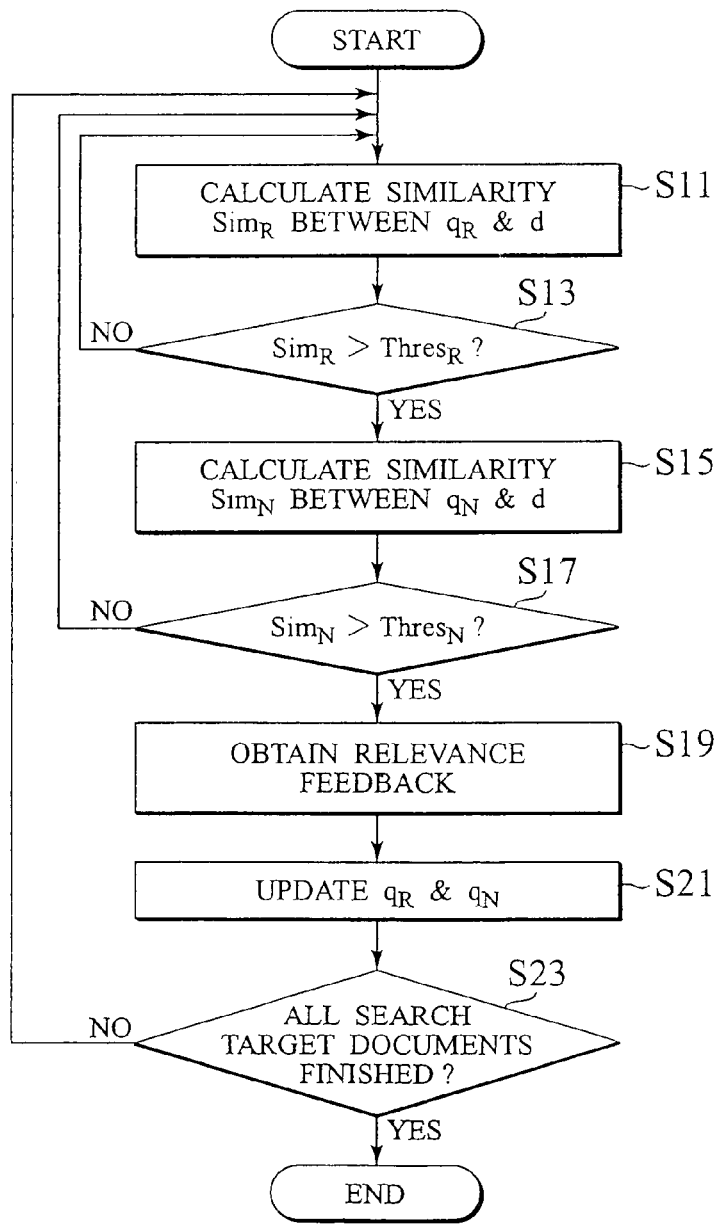
FIG. 5 is a flow chart for the document filtering processing utilizing a non-relevant profile in the document filtering system of FIG. 4.

Referring now to FIG. 5, the procedure of the document filtering processing utilizing the non-relevant profile in the document filtering system of FIG. 4 will be described.

First, the similarity $Sim_R$ between the relevant profile representing the user's request and the search target document d is calculated (step S11), and whether this calculated similarity $Sim_R$ is higher than a prescribed threshold $Thres_R$ for the relevant profile or not is judged (step S13). When the calculated similarity $SiM_R$ is lower than or equal to the prescribed threshold $Thres_R$, the processing returns to the initial step S11 and the same processing is repeated for the next search target document.

On the other hand, when the calculated similarity $Sim_R$ is higher than the prescribed threshold $Thres_R$, the similarity $Sim_N$ between the non-relevant profile $q_N$ and the search target document d is calculated (step S15). Then, whether this calculated similarity $Sim_N$ is lower than a prescribed threshold $Thres_N$ for the non-relevant profile or not is judged (step S17). When the similarity $Sim_N$ is not lower than the prescribed threshold $Thres_N$, i.e., when the similarity $Sim_N$ is higher than or equal to the prescribed threshold $Thres_N$, this search target document d is regarded as a non-relevant document and not selected, i.e., removed. Then, the processing returns to the initial step S11 and the same processing is repeated for the next search target document.

On the other hand, when the similarity $Sim_N$ is lower than the prescribed threshold $Thres_N$, this search target document is regarded as a relevant document and outputted to the user. Then, a relevance feedback for this document is obtained from the user (step S19), and the relevant profile $q_R$ and the non-relevant profile $q_N$ are updated by the equations (22) and (23) described above (step S21). This processing is repeated for all the search target documents (step S23).

By the above processing, it is possible to reduce the number of erroneously selected non-relevant documents, by deleting those documents which are similar to the non-relevant documents that were erroneously selected in the past, from the documents that are judged as similar to the relevant profile $q_r$.

Figure 6:
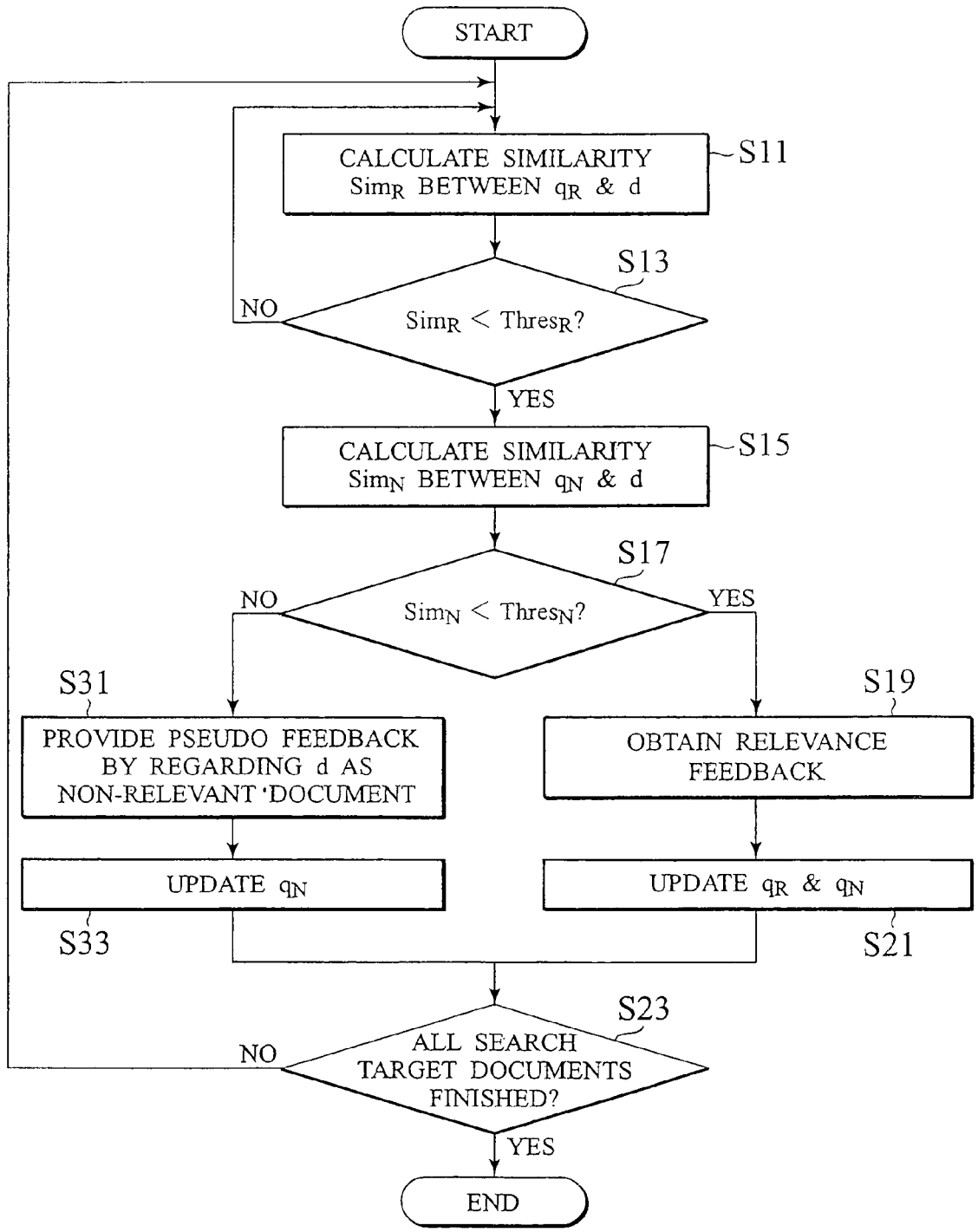
FIG. 6 is a flow chart for the document filtering processing utilizing a relevant profile according to a pseudo feedback in the document filtering system of FIG. 4.

Referring now to FIG. 6, the procedure of the document filtering processing utilizing the relevant profile according to a pseudo feedback in the document filtering system of FIG. 4 will be described. Here, the pseudo feedback is a feedback of documents that are regarded as non-relevant documents in the procedure of FIG. 5 described above, to the system.

The document filtering processing shown in FIG. 6 differs from that of FIG. 5 in that, at the step S17, when the similarity $Sim_N$ judges as not lower than the prescribed threshold $Thres_N$, i.e., when the similarity $Sim_N$ is judged as higher than or equal to the prescribed threshold $Thres_N$, this search target document d is regarded as a non-relevant document and the pseudo feedback is provided (step S31), and then the non-relevant profile $q_N$ is updated according to information of the pseudo feedback (step S33). The rest of the procedure of FIG. 6 is the same as that of FIG. 5, and the identical steps are given the same reference numerals in the figures.

In this way, by regarding the search target document for which the similarity $Sim_N$ is higher than or equal to the prescribed threshold $Thres_N$ as a non-relevant document, providing the pseudo feedback for this document, and also utilizing the information of the pseudo feedback in the updating of the non-relevant profile, it is possible to increase the information to be utilizing in updating the non-relevant profile. As a result, it is possible to compensate for a decrease of the feedback information to be utilized in the updating of the non-relevant profile $q_N$ that can arise in conjunction with a decrease of the selected documents when the threshold for the similarity with respect to the non-relevant profile $q_N$ is set higher.

Namely, by providing the pseudo feedback as described above, it becomes possible to set the threshold for the non-relevant profile $q_N$ higher so that it becomes possible to produce the effective non-relevant profile $q_N$ according to information on many documents while maintaining the effect of filtering utilizing the non-relevant profile $q_N$.

Figure 7:
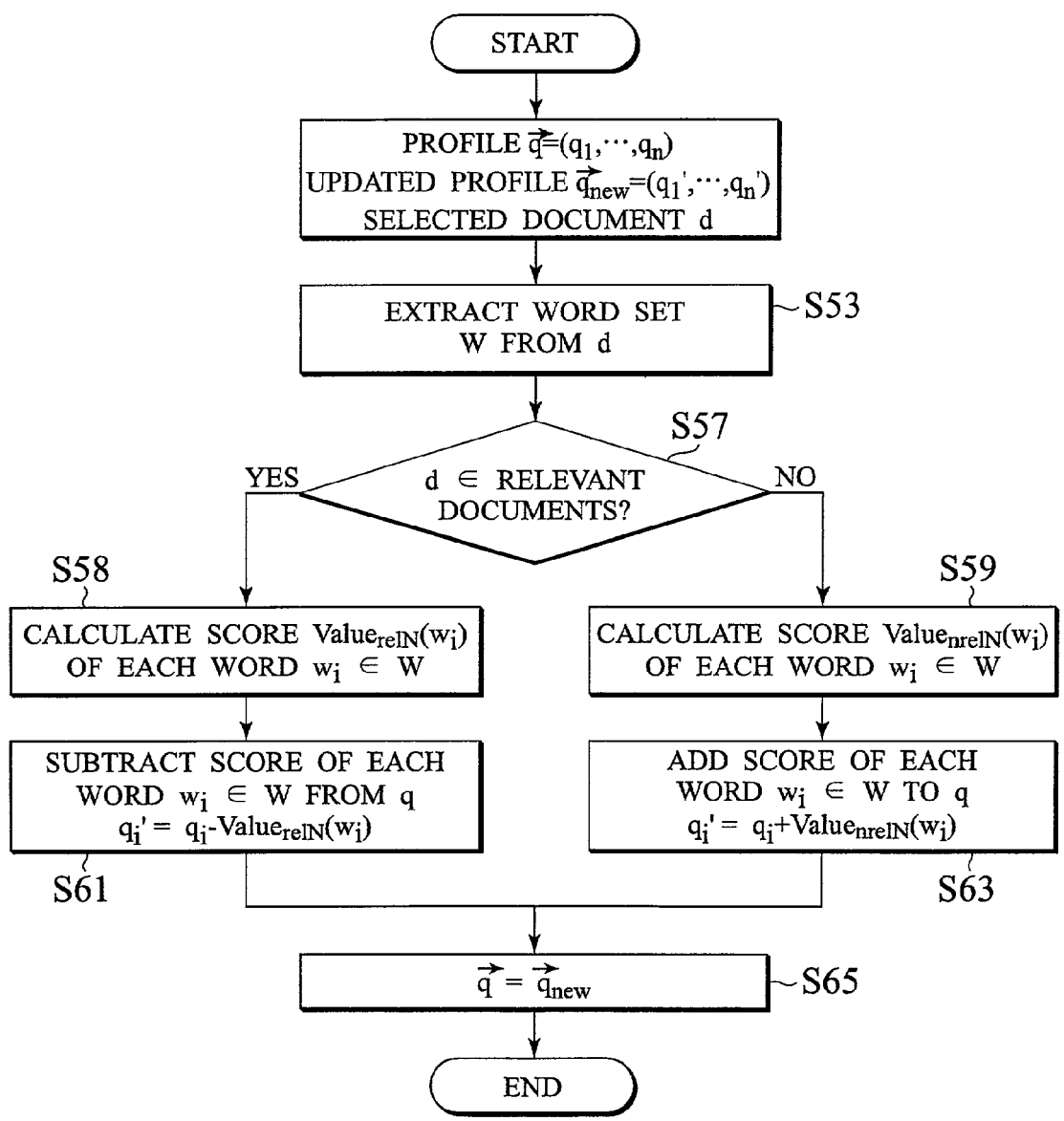
FIG. 7 is a flow chart for a non-relevant profile updating processing to be carried out in the document filtering processing of FIG. 5 or FIG. 6.

Referring now to FIG. 7, the procedure for the non-relevant profile updating processing to be carried out in the document filtering processing of FIG. 5 or FIG. 6 will be described.

As shown in FIG. 7, with respect to the profile q, the updated profile $q_{new}$, and the selected document d which are expressed according to the vector space model, a word set W is extracted from the selected document d first (step S53), and whether the selected document d is a relevant document or not is judged (step S57). When the selected document d is a relevant document, the score of each word is calculated by the equation (16) (step S58), and the score of each word $w_i$ is subtracted from the profile q as in the equation (22) (step S61). When the selected document d is not a relevant document, the score of each word is calculated by the equation (17) (step S59), and the score of each word $w_i$ is added to the profile q as in the equation (23) (step S63). Then, the profile after such addition or subtraction is set as the updated profile $q_{new}$ (step S65).

As described above, according to the present invention, a profile characterizing the non-relevant documents that were judged as not matching with the user's request is produced as a non-relevant profile, and when the search target document has a high similarity with respect to the relevant profile, the similarity with respect to the non-relevant profile is calculated and when this similarity is high this search target document is regarded as a non-relevant document and removed, so that it is possible to reduce the number of erroneously selected non-relevant documents without reducing the number of correctly selected relevant documents, and thereby it is possible to improve the filtering performance.

Also, according to the present invention, words expressing features of the selected document are extracted, the contribution of each extracted word is calculated, and the score of each extracted word is calculated by multiplying a weight to the word contribution. Then, the non-relevant profile is updated by subtracting the score of each extracted word when the selected document is a relevant document, or by adding the score of each extracted word when the selected document is the non-relevant document, so that it is possible to improve the document filtering accuracy by appropriately updating the non-relevant profile.

It is to be noted that the above described embodiment according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the document filtering system of FIG. 4 can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiment may be made without departing from the novel and advantageous features of the present invention. Accordingly, all such modifications and variations are intended to be included within the scope of the appended claims.

What is claimed is:

1. A document filtering method using a computer for extracting documents matching with a relevant profile expressing a user's request in terms of features of relevant documents that were correctly selected in the past by the computer from search target documents and presenting extracted documents to a user through the computer, comprising the steps of:
   producing a non-relevant profile expressing non-relevant documents in terms of features of documents that were judged in the past as having high similarities with respect to the relevant profile by the computer but not matching with the user's request;
   calculating a first similarity between the relevant profile and each search target document, and comparing the first similarity with a prescribed first threshold for the relevant profile;
   calculating a second similarity between the non-relevant profile and each search target document for which the first similarity is higher than the prescribed first threshold, and comparing the second similarity with a prescribed second threshold for the non-relevant profile;
   removing each search target document for which the first similarity is higher than the prescribed first threshold and the second similarity is higher than the prescribed second threshold as a non-relevant document, and selecting each search target document for which the first similarity is higher than the prescribed first threshold and the second similarity is not higher than the prescribed second threshold as a document to be presented to the user; and
   updating the relevant profile and the non-relevant profile according to a feedback from the user regarding relevance of documents presented to the user.

2. The document filtering method of claim 1, wherein the updating step updates the non-relevant profile by:
   extracting words expressing features of a selected document according to word contributions, from words appearing in a selected document;
   calculating a contribution of each extracted word;
   calculating a score of each extracted word by multiplying a weight to the word contribution of each extracted word; and
   an updating the non-relevant profile by subtracting the score of each extracted word from the non-relevant profile when the selected document is a relevant document, or by adding the score of each extracted word to the non-relevant profile when the selected document is a non-relevant document.

3. The document filtering method of claim 1, wherein the updating step updates the non-relevant profile also according to a pseudo feedback regarding those search target documents that are regarded as non-relevant documents.

4. The document filtering method of claim 1, wherein the removing step also removes each search target document for which the first similarity is not higher than the prescribed first threshold as a non-relevant document.

5. A document filtering system using a computer for extracting documents matching with a relevant profile expressing a user's request in terms of features of relevant documents that were correctly selected in the past by the computer from search target documents and presenting extracted documents to a user through the computer, comprising:
   a non-relevant profile production unit configured to produce a non-relevant profile expressing non-relevant documents in terms of features of documents that were judged in the past as having high similarities with respect to the relevant profile by the computer but not matching with the user's request;
   a relevant profile similarity calculation unit configured to calculate a first similarity between the relevant profile and each search target document, and compare the first similarity with a prescribed first threshold for the relevant profile;
   a non-relevant profile similarity calculation unit configured to calculate a second similarity between the non-relevant profile and each search target document for which the first similarity is higher than the prescribed first threshold, and compare the second similarity with a prescribed second threshold for the non-relevant profile;
   a relevance judgment unit configured to remove each search target document for which the first similarity is higher than the prescribed first threshold and the second similarity is higher than the prescribed second threshold as a non-relevant document, and select each search target document for which the first similarity is higher than the prescribed first threshold and the second similarity is not higher than the prescribed second threshold as a document to be presented to the user; and
   a profile updating unit configured to update the relevant profile and the non-relevant profile according to a feedback from the user regarding relevance of documents presented to the user.

6. The document filtering system of claim 5, wherein the profile updating unit is configured to update the non-relevant profile by:
   extracting words expressing features of a selected document according to word contributions, from words appearing in a selected document;
   calculating a contribution of each extracted word;
   calculating a score of each extracted word by multiplying a weight to a word contribution of each extracted word; and an updating the non-relevant profile by subtracting the score of each extracted word from the non-relevant profile when the selected document is a relevant document, or by adding the score of each extracted word to the non-relevant profile when the selected document is a non-relevant document.

7. The document filtering system of claim 5, wherein the profile updating unit is configured to update the non-relevant profile also according to a pseudo feedback regarding those search target documents that are regarded as non-relevant documents.

8. The document filtering system of claim 5, wherein the relevance judgment unit is configured to also remove each search target document for which the first similarity is not higher than the prescribed first threshold as a non-relevant document.

9. A computer usable medium having computer readable program codes embodied therein for causing a computer to function as a document filtering system for extracting documents matching with a relevant profile expressing a user's request in terms of features of relevant documents that were correctly selected in the past by the computer from search target documents and presenting extracted documents to a user through the computer, the computer readable program codes include:
  a first computer readable program code for causing said computer to produce a non-relevant profile expressing non-relevant documents in terms of features of documents that were judged in the past as having high similarities with respect to the relevant profile by the computer but not matching with the user's request;
  a second computer readable program code for causing said computer to calculate a first similarity between the relevant profile and each search target document, and compare the first similarity with a prescribed first threshold for the relevant profile;
  a third computer readable program code for causing said computer to calculate a second similarity between the non-relevant profile and each search target document for which the first similarity is higher than the prescribed first threshold, and compare the second similarity with a prescribed second threshold for the non-relevant profile;
  a fourth computer readable program code for causing said computer to remove each search target document for which the first similarity is higher than the prescribed first threshold and the second similarity is higher than the prescribed second threshold as a non-relevant document, and select each search target document for which the first similarity is higher than the prescribed first threshold and the second similarity is not higher than the prescribed second threshold as a document to be presented to the user; and
  a fifth computer readable program code for causing said computer to update the relevant profile and the non-relevant profile according to a feedback from the user regarding relevance of documents presented to the user.

10. The computer usable medium of claim 9, wherein the fifth computer readable program code causes said computer to update the non-relevant profile by:
  extracting words expressing features of a selected document according to word contributions, from words appearing in a selected document;
  calculating a contribution of each extracted word;
  calculating a score of each extracted word by multiplying a weight to the word contribution of each extracted word; and
  an updating the non-relevant profile by subtracting the score of each extracted word from the non-relevant profile when the selected document is a relevant document, or by adding the score of each extracted word to the non-relevant profile when the selected document is a non-relevant document.

11. The computer usable medium of claim 9, wherein the fifth computer readable program code causes said computer to update the non-relevant profile also according to a pseudo feedback regarding those search target documents that are regarded as non-relevant documents.

12. The computer usable medium of claim 9, wherein the fourth computer readable program code causes said computer to also remove each search target document for which the first similarity is not higher than the prescribed first threshold as a non-relevant document.

* * * * *